United States Patent [19]

Matsuda

[11] Patent Number: 5,140,524
[45] Date of Patent: Aug. 18, 1992

[54] ANTI-SKID BRAKE CONTROL SYSTEM WITH VARIABLE WHEEL SLIPPAGE CRITERION DEPENDING UPON VEHICULAR DRIVING CONDITION

[75] Inventor: Toshiro Matsuda, Kanagawa, Japan

[73] Assignee: Nissan Motor Company, Limited, Yokohama, Japan

[21] Appl. No.: 525,773

[22] Filed: May 21, 1990

[30] Foreign Application Priority Data

May 19, 1989 [JP] Japan .................. 1-125652

[51] Int. Cl.[5] .................. G06F 15/20; B60T 8/58
[52] U.S. Cl. .................. 364/426.02; 180/197; 303/95
[58] Field of Search .................. 364/426.01, 426.02; 180/197; 303/95, 100, 102, 105

[56] References Cited

U.S. PATENT DOCUMENTS

| | | | |
|---|---|---|---|
| 4,693,522 | 9/1987 | Wupper et al. | 303/105 |
| 4,809,183 | 2/1989 | Eckert | 364/426.04 |
| 4,902,076 | 2/1990 | Ushijima et al. | 364/426.02 |
| 4,932,726 | 6/1990 | Iwata et al. | 303/100 |
| 4,962,455 | 10/1990 | Ishikawa et al. | 364/426.02 |
| 4,967,865 | 11/1990 | Schindler | 180/79.1 |
| 4,970,649 | 11/1990 | Matsuda | 364/426.02 |
| 4,974,163 | 11/1990 | Yasuno et al. | 364/426.02 |
| 4,980,831 | 12/1990 | Katayama et al. | 364/426.02 |

FOREIGN PATENT DOCUMENTS

3719748 A1 12/1988 Fed. Rep. of Germany.
3719748A1 12/1988 Fed. Rep. of Germany.

Primary Examiner—Thomas G. Black
Attorney, Agent, or Firm—Foley & Lardner

[57] ABSTRACT

An anti-skid brake control system has a plurality of wheel speed sensors for monitoring rotation speed of each of the associated wheels independently of the others. Projected vehicle speed representative data is derived on the basis of one of the wheel speed indicative data representing the highest wheel speed. Wheel slippage criteria providing references for judgement whether wheel slip magnitude is in excess of a predetermined magnitude, are derived on the basis of the projected vehicle speed representative data. The system includes means for monitoring vehicular cornering behavior for making correction of said wheel slippage criteria on the basis of the magnitude of wheel speed difference between inner and outer wheels at a corner or curve for adapting respective wheel slippage criteria to the vehicular cornering behavior.

8 Claims, 8 Drawing Sheets

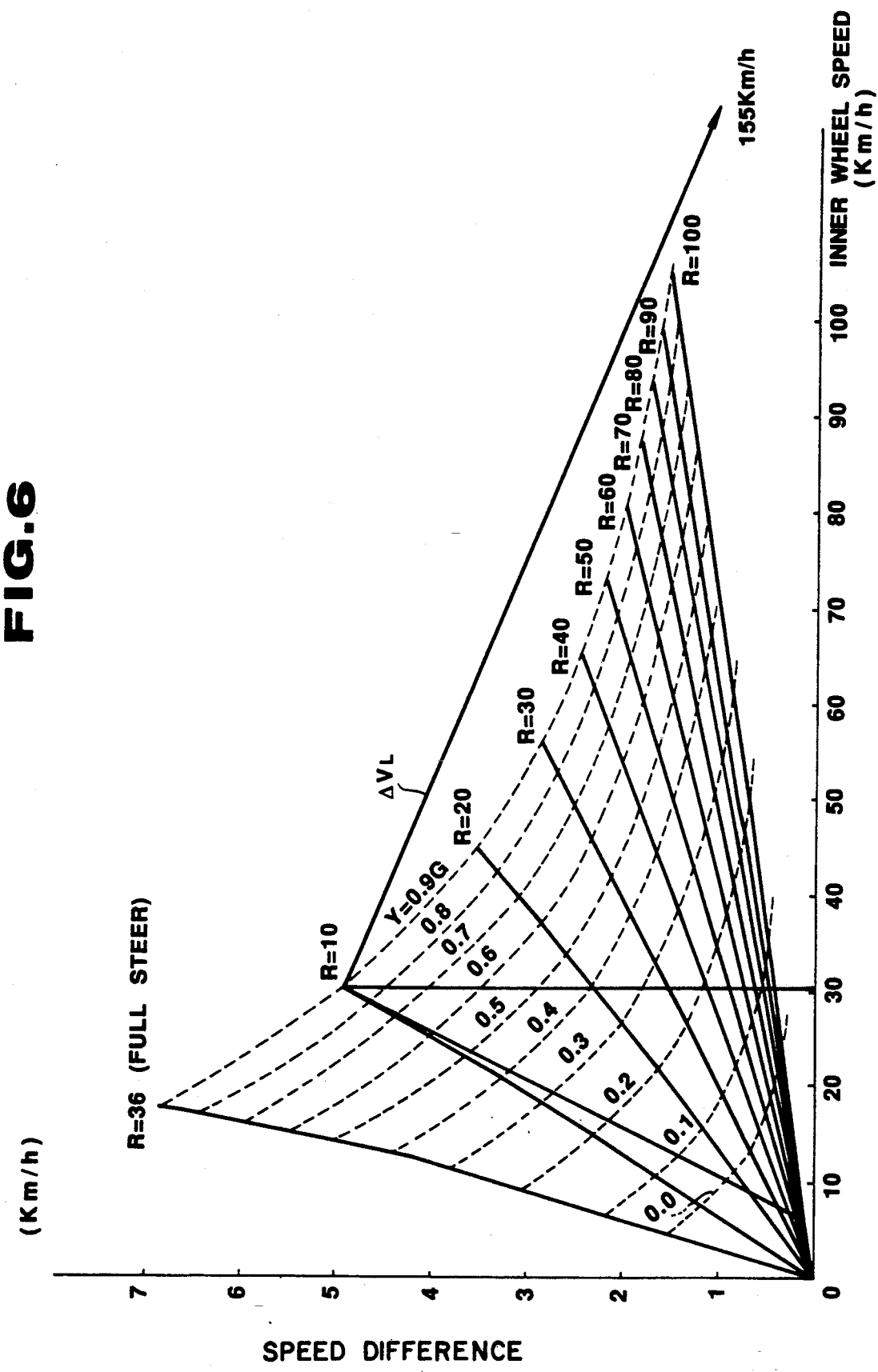

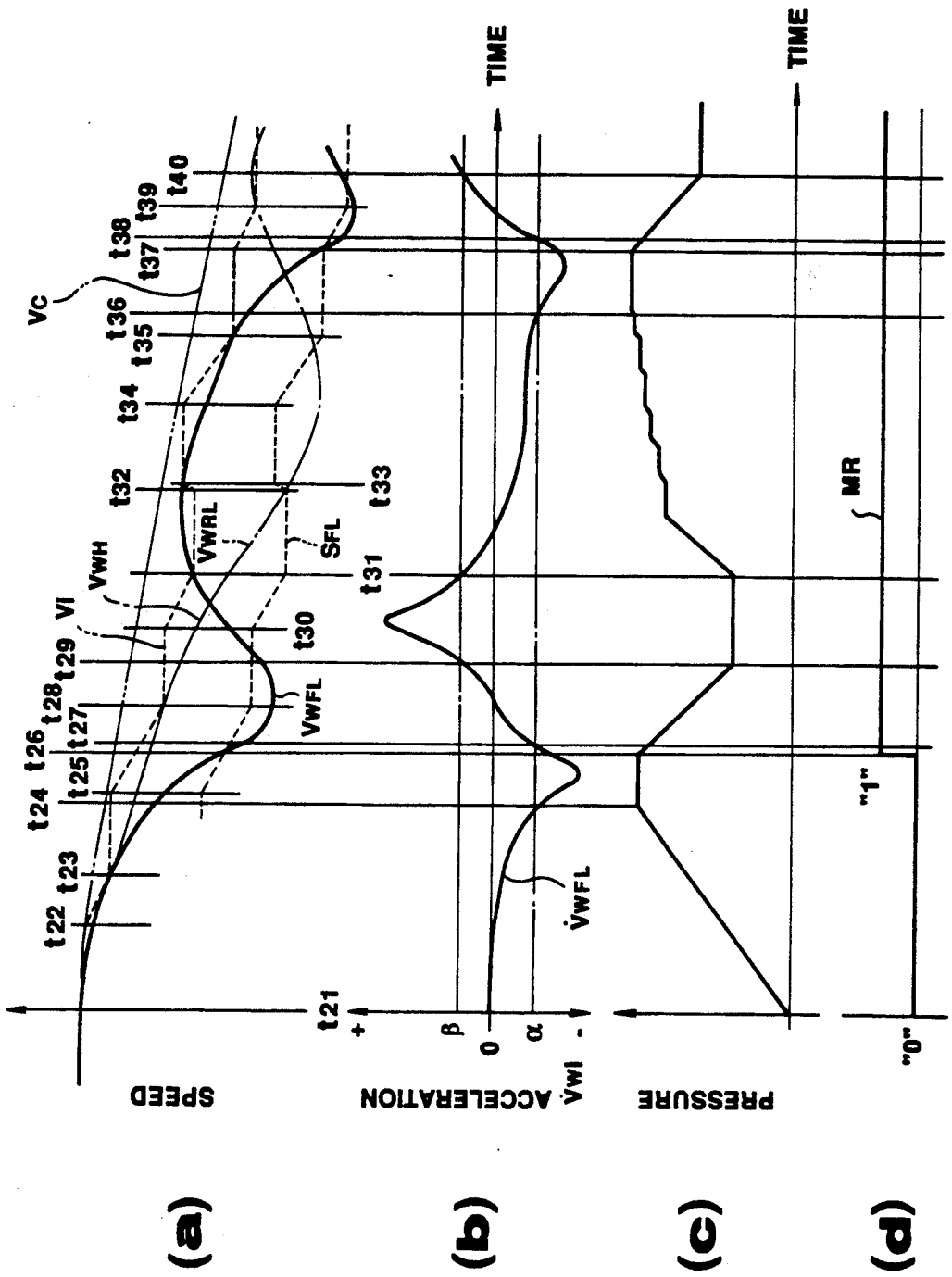

ANTI-SKID BRAKE CONTROL SYSTEM WITH VARIABLE WHEEL SLIPPAGE CRITERION DEPENDING UPON VEHICULAR DRIVING CONDITION

BACKGROUND OF THE INVENTION

1. Field of the Invention

The present invention relates generally to an anti-skid brake control system for an automotive vehicle. More specifically, the invention relates to an anti-skid brake control system which enhances vehicular braking performance, particularly at braking during cornering.

2. Description of the Background Art

It is well known that vehicular braking performance becomes optimum when wheel slippage becomes a certain value, e.g. 10% to 20%. Therefore, as is well known, anti-skid or anti-lock brake control is generally performed for maintaining the wheel slippage within a predetermined optimal range. For this, wheel slippage is monitored for controlling operational modes of a vehicular braking system for increasing braking pressure in an APPLICATION mode, holding braking pressure constant in a HOLD mode and decreasing braking pressure in a RELEASE mode. In vehicular anti-skid brake control, the APPLICATION mode is selected for a normal operational condition for allowing linear decelerating of the vehicle according to an increasing braking pressure. Anti-skid control is initiated upon detection of wheel deceleration during braking operation, in a greater magnitude than a preset deceleration threshold to switch the operational mode of the brake system from an APPLICATION mode to a HOLD mode. Therefore, at the initial stage of an anti-skid brake control cycle, the braking pressure is held constant at an increased pressure at which the wheel deceleration increase across the wheel deceleration threshold is obtained, in a HOLD mode. Because of the increased pressure in this HOLD mode, wheel speed further decelerates at a greater rate than deceleration of the vehicle speed. Therefore, wheel slippage which represents a ratio of the difference of the vehicle speed and the wheel speed versus the vehicle speed, becomes greater than a target speed which represents the optimal wheel speed for obtaining optimum vehicular braking characteristics. When the wheel slippage becomes greater than a wheel slippage threshold and thus the wheel speed is decreased across the target speed, the operational mode of the brake system is again switched into the RELEASE mode for decreasing the braking pressure for resuming wheel speed toward the target speed. By this, the wheel speed resumes across the target speed. Therefore, wheel acceleration increases across a present acceleration threshold. Then, the mode is again switched into the HOLD mode. Because of decreased braking pressure, the wheel speed overshoots to increase across the vehicle speed and then is decelerated to the vehicle speed. Accordingly, the wheel acceleration again decreases across the acceleration threshold. Then, the mode is switched to APPLICATION mode again.

In the anti-skid control set forth above, it becomes necessary to monitor the vehicle speed for deriving the wheel slippage. It is possible to directly measure the vehicle speed by means of an appropriate sensor, such as a doppler sensor. However, such a sensor is unacceptably expensive and therefore is not practical for use in the anti-skid control system in view of the cost. Therefore, a usual way for monitoring the vehicle speed for anti-skid control is to latch a wheel speed upon initiation of anti-skid control as vehicle speed representing data, because upon initiation of the anti-skid control where the wheel deceleration increased across the wheel deceleration threshold, it is approximately coincident with the vehicle speed. This vehicle speed representing data will be hereafter referred to as the "projected speed". Based on the latched value, vehicle speed represented data is projected utilizing a given vehicle deceleration indicative gradient which can be derived in various ways.

One of the typical processes for deriving the projected vehicle speed representative data is by selecting a highest value of wheel speed data for use as initial data in derivation of the projected vehicle speed representative data. such a strategy of selection of the wheel speed data to be used for projection of the vehicle speed representative data has been proposed in Japanese Patent Second (allowed) Publication 41-17082. During a braking operation, the selected highest value of the wheel speed data is held as an initial value of the projected vehicle speed representative data when the wheel deceleration increases across a predetermined deceleration threshold so that the vehicle speed representative data can be projected with the initial value and a given gradient of vehicle speed variation.

Such a manner of selection of the wheel speed data to be used for projecting the vehicular speed may provide an acceptably high level of precision in most occasions. However, such a manner of selection of the wheel speed data may induce a problem in derivation of the projected vehicular speed representative data in a braking operation during cornering. As can be appreciated, during cornering, the wheel speed at the outer wheel is higher than that at the inner wheel. Therefore, if the projected vehicular speed representative value is derived on the basis of the highest wheel speed data, and if the wheel slippage criterion is derived on the basis of the projected vehicular speed representative value thus derived, erroneous detection of an occurrence of wheel slippage greater than the wheel slippage criterion can be caused due to low wheel speed at the inner wheel. Also, during high speed cornering on a high friction road, such as a dry road, since the tail of the vehicle can be forced toward the outside of the curve, the wheel speed at the rear wheels becomes higher than at the front wheels. When the wheel speed difference at the front and rear wheels becomes substantial, erroneous detection of wheel slippage in excess of the wheel slippage criterion can be caused at the front wheels for erroneously initiating anti-skid control.

SUMMARY OF THE INVENTION

Therefore, it is an object of the present invention to provide an anti-skid brake control system which can avoid the influence on anti-skid control due to the wheel speed difference induced by a vehicular driving condition.

In order to accomplish the aforementioned and other objects, an anti-skid brake control system, according to the present invention, has a plurality of wheel speed sensors for monitoring rotation speed of associated wheels independently of each other. Projected vehicle speed representative data is derived on the basis of one of the wheel speed indicative data representing the highest wheel speed. Wheel slippage criteria providing references for judgement whether wheel slip magnitude is in excess of a predetermined magnitude, is derived on the basis of the projected vehicle speed representative data. The system includes means for monitoring vehicular cornering behavior for making a correction of said wheel slippage criteria on the basis of the magnitude of wheel speed difference between inner and outer wheels at a corner or curve for adapting respective wheel slippage criteria to the vehicular cornering behavior.

According to one aspect of the invention, an anti-skid brake control system comprises:

a first pressure control valve unit disposed between a braking pressure source and a first wheel cylinder associated with a first wheel oriented on one side of a vehicle body for adjusting braking pressure in the first wheel cylinder according to a first brake control signal;

a second pressure control valve unit disposed between a braking pressure source and a second wheel cylinder associated with a second wheel oriented on the other side of a vehicle body for adjusting braking pressure in the second wheel cylinder according to a second brake control signal;

a first wheel speed sensor for monitoring the rotation speed of the first wheel to produce a first wheel speed indicative signal;

a second wheel speed sensor for monitoring the rotation speed of the second wheel to produce a second wheel speed indicative signal;

a third sensor for detecting a vehicular driving parameter inducing wheel speed difference between the first and second wheels to produce a third signal representative of the magnitude of the vehicular driving parameter;

a first arithmetic means for selecting one of the first and second wheel speed indicative signals for deriving a vehicular speed representative value based thereon;

a second arithmetic means for deriving a first wheel slippage threshold value for the first wheel on the basis of the vehicular speed representative value and the third signal;

a third arithmetic means for deriving a second wheel slippage threshold value for the second wheel on the basis of the vehicular speed representative value and the third signal; and a controller for comparing the first wheel speed indicative signal with the first wheel slippage threshold and the second wheel speed indicative signal with the second wheel slippage for deriving the first and second brake control signal on the basis of the results of comparison so as to optimize vehicular braking performance.

In the preferred construction, the second and third arithmetic circuits are so designed to set the wheel slippage threshold at a smaller value than that set during straight travel for the associated one of of the wheels which is oriented inside with respect to the curve center. Preferably, the third sensor comprises a lateral acceleration sensor. As an alternative, the third sensor comprises a vehicle speed sensor and a steering angle sensor.

According to another aspect of the invention, in an anti-skid brake control system associated with a vehicular brake system including a first pressure control valve disposed between a braking pressure source and a first wheel cylinder associated with a first wheel oriented on one side of a vehicle body for adjusting braking pressure in the first wheel cylinder according to a first brake control signal, second pressure control valve disposed between a braking pressure source and a second wheel cylinder associated with a second wheel oriented on the other side of a vehicle body for adjusting braking pressure in the second wheel cylinder according to a second brake control signal, a first wheel speed sensor for monitoring rotation speed of the first wheel to produce a first wheel speed indicative signal, a second wheel speed sensor for monitoring rotation speed of the second wheel to produce a second wheel speed indicative signal, a first means for selecting one of the first and second wheel speed indicative signals for deriving a vehicular speed representative value based thereon, a second circuit for deriving a wheel slippage threshold, and a controller for comparing the first wheel speed indicative signal with the first wheel slippage threshold and the second wheel speed indicative signal with the second wheel slippage for deriving the first and second brake control signals on the basis of the results of comparison so as to optimize vehicular braking performance, wherein the second means comprises:

a third sensor for detecting vehicular driving parameter inducing wheel speed difference between the first and second wheels to produce a third signal representative of the magnitude of the vehicular driving parameter, a second arithmetic means for deriving a first wheel slippage threshold value for the first wheel on the basis of the vehicular speed representative value and the third signal;

a third arithmetic means for deriving a second wheel slippage threshold value for the second wheel on the basis of the vehicular speed representative value and the third signal.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 6 is a chart showing the relationship between inner front wheel speed and wheel speed difference in terms of lateral acceleration exerted on the vehicle body FIG. 8 is chart showing a process of an selection of operational mode in a skid control cycle and FIGS. 9 and 10 are timing charts showing the operation of the anti-skid control system during accelerating and decelerating states.

DESCRIPTION OF THE PREFERRED EMBODIMENT

Figure 1:
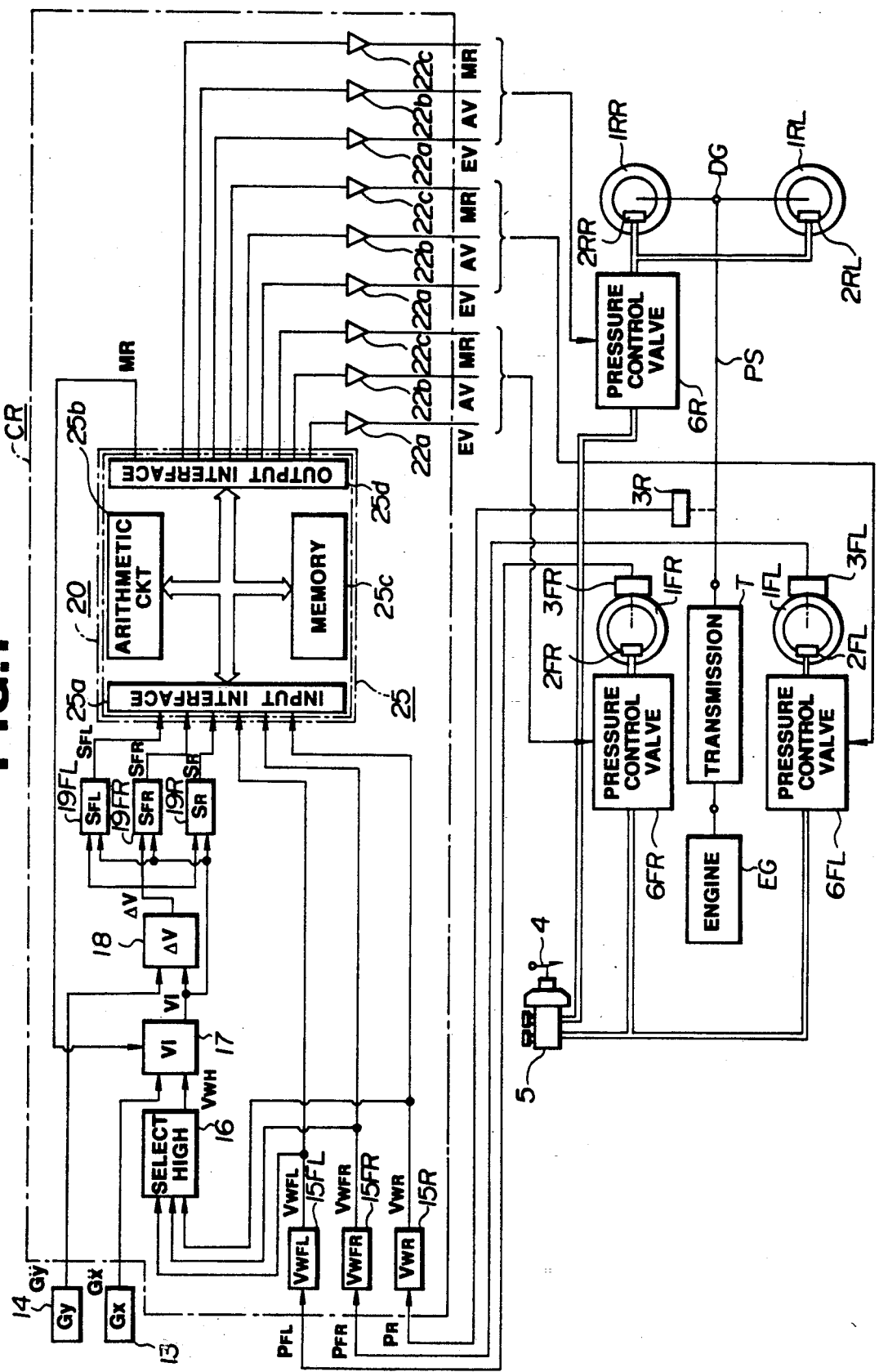
FIG. 1 is a schematic block diagram of the preferred embodiment of an anti-skid brake control system according to the present invention

Referring now to the drawings, particularly to FIG. 1, the embodiment shown of an anti-skid brake control system, according to the present invention, is designed to apply braking force for front-left, front-right and rear wheels 1FL, 1FR, 1RL and 1RR respectively. The embodiment shown of the anti-skid brake control system is applied for the rear wheel drive power train layout, in which the rear wheels 1RL and 1RR are connected to an automotive internal combustion engine EG via a power train including a power transmission T, a power shaft PS and a differential gear unit DG. Wheel cylinders 2FL to 2RR are provided for respective wheels 1FL to 1RR for applying braking force to decelerate the vehicle. Wheel speed sensors 3FL and 3FR are provided for monitoring rotation speed of respective front-left and front right wheels 1FL and 1FR to produce front-left and front-right wheel speed indicative signals $P_{FL}$ and $P_{FR}$. A wheel speed sensor 3R is associated the power shaft PS for monitoring rotation speed thereof to produce a fear wheel speed indicative signal $P_R$ representative of an average speed of the rear-left and rear-right wheels 1RL and 1RR. The front-left and front-right wheel cylinders 2FL and 2FR are connected to a master cylinder 2 via front-left and front-right pressure control valve units 6FL and 6FR so that pressurized working fluid can be supplied to respective ones of the front-left and front-right wheel cylinders independently of the other. The rear-left and rear-right wheel cylinders 2RL and 2RR are also connected to the master cylinder 2 via a rear pressure control valve unit 6R.

Figure 2:
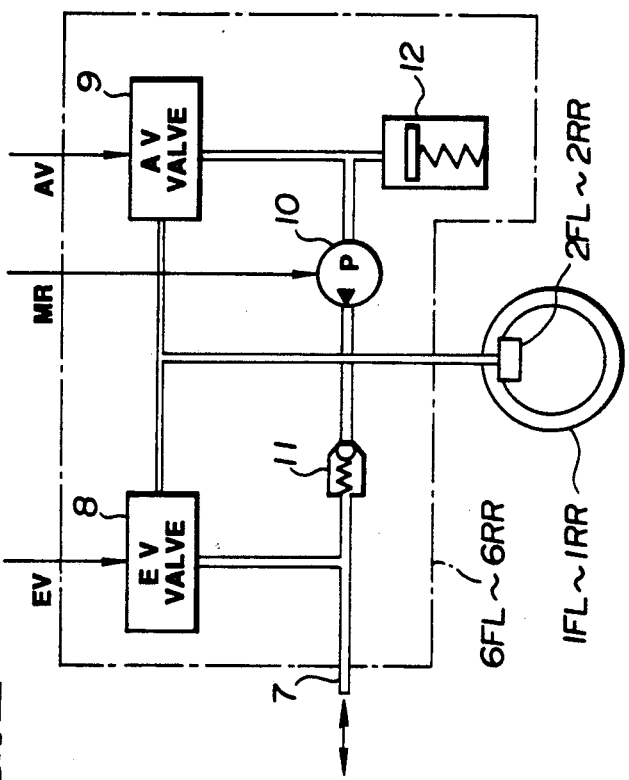
FIG. 2 is a block diagram of a pressure control valve unit employed in the preferred embodiment of the anti-skid brake control system of FIG. 1

FIG. 2 shows one example of the pressure control valve unit 6 which may be employed in the anti-skid brake control. As can be seen from FIG. 2, the pressure control valve unit 6 includes an inlet control (EV) valve 8 and an outlet control (AV) valve 9. The pressure control valve unit 6 also includes a drain pump 10 driven by means of an electric motor which is controlled by MR signal from the anti-skid control channel. The pressure control valve unit 6 has an inlet port connected to the master cylinder 5 to receive the working fluid pressure built up in the latter and an outlet port connected the associated one or two of wheel cylinders 2FL, 2FR, 2RL and 2RR. The wheel cylinders 2FL, 2FR, 2RL and 2RR as generally referred to will be hereafter represented by the reference numeral "2". The EV valve 8 is interposed between the inlet port and the outlet port for controlling introduction of the pressurized working fluid to the wheel cylinder. The AV valve 9 is connected to the outlet of the EV valve 8, to the outlet port at the inlet side and to the pressure accumulator 12 and the drain pump 10. The discharge outlet drain pump 10 is connected to the inlet port via a one-way check valve 11 for returning part of the working fluid in the pressure control valve unit 6 to the fluid reservoir (not shown) designed for supplying pressurized working fluid.

The EV valve 8 includes an electromagnetic actuator $45g_1$, such as solenoid. The electromagnetic actuator $45g_1$ is connected to the omitter electrode of a power transistor which comprises a PNP transistor and has the base electrode connected to the anti-skid control channel. The collector electrode of the power transistor is connected to the positive power source +B via a relay switch. The relay switch has a normally open contact. As long as no fault in the acceleration sensors is detected, the relay coil is held energized for closing normally closed contact for establishing electrical connection between the positive power source +B and the collector electrode of the power transistor. Similarly, the AV valve 9 includes an electromagnetic actuator, such as solenoid. The electromagnetic actuator is connected to the collector electrode of a power transistor which comprises a NPN type transistor and has a base electrode connected to the anti-skid control channel. On the other hand, the omitter electrode of the power transistor is connected to the positive power source +B via the switching relay electrode of a power transistor. The drain pump 10 is driven by the HIGH level MR signal.

The pressure control valve unit 6 is generally operated in the aforementioned three mode positions over a skid control cycles. In general, skid control cycle is scheduled as follows:

1) the pressure control valve unit 6 is maintained at the APPLICATION mode position upon initiation of the braking operation which is triggered by depression of the brake pedal 4, 2) by application of the braking force to the brake pedal, working fluid pressure is built up in the master cylinder 5, since the pressure control valve unit 6 is held at the APPLICATION mode position, the braking pressure in the wheel cylinder 2 is increased linearly in proportion to increasing of the working fluid pressure to decelerate the wheel speed;

3) by increasing of the braking pressure, wheel deceleration $-\alpha$ (negative value of wheel acceleration) increases and becomes greater than a predetermined deceleration threshold $-\alpha_2$, the anti-skid control channel is responsive to the wheel deceleration increased across the deceleration threshold to initiate a skid control cycle, upon which the skid control cycle enters into a HOLD mode cycle period to place the pressure control valve unit 6 at the HOLD mode position to maintain the increased level of braking pressure constant;

4) by holding the increased level of braking pressure in the HOLD mode position of the pressure control valve unit 6, wheel is decelerated to increase the wheel slippage across a predetermined wheel slippage threshold, the anti-skid control channel is responsive to increasing of the wheel slippage increasing across the wheel slippage threshold to terminate the HOLD mode cycle period and trigger RELEASE mode cycle period, in which the pressure control valve unit 6 is placed in the RELEASE mode position to decrease braking pressure in the wheel cylinder 2;

5) by maintaining the pressure control valve unit 6 in the RELEASE mode position, braking pressure is reduced and thus the wheel is accelerated to result in increasing of wheel acceleration $+\alpha$ across a predetermined wheel acceleration threshold $+\alpha_1$, the anti-skid control channel is responsive to increasing of the wheel acceleration $+\alpha$ across the wheel acceleration threshold $+\alpha_1$ to terminate the RELEASE mode cycle period and trigger a HOLD mode cycle period to switch the position of the pressure control valve unit 6 from the RELEASE mode position to the HOLD mode position in order to hold the braking pressure at the lowered level;

6) by maintaining the pressure control valve unit 6 at the HOLD mode, wheel speed is resumed and increased across the vehicle body speed and subsequently returned to the speed corresponding to the vehicle body speed, the anti-skid control channel is responsive to the wheel speed once increased across the vehicle body speed and subsequently returned to the vehicle body speed to the terminate HOLD mode cycle period and trigger the APPLICATION mode cycle period;

The skid cycles 3) to 6) are repeated while anti-skid control is active.

The electromagnetic actuators of respective pressure control valve units 6FL to 6R are connected to a control unit CR which typically comprises a micoprocessor 25. The control unit CR includes wheel speed derivation circuits 15FL, 15FR and 15R. The wheel speed derivation circuits 15FL, 15FR and 15R are connected to respectively associated ones of wheel speed sensors 3FL, 3FR and 3R to receive therefrom the wheel speed indicative signals $P_{FL}$, $P_{FR}$ and $P_R$ in order to derive wheel speed indicative data $Vw_{FL}$, $Vw_{FR}$ and $Vw_R$ based thereon. The wheel speed derivation circuits 15FL, 15FR and 15R output the wheel speed indicative data $Vw_{FL}$, $Vw_{FR}$ and $Vw_R$. The wheel speed indicative data $Vw_{FL}$, $Vw_{FR}$ and $Vw_R$ are input to an input interface 25a of the microprocessor 25 which forms central unit 20 of the control unit CR. The wheel speed indicative data $Vw_{FL}$, $Vw_{FR}$ and $Vw_R$ are also supplied to a select HIGH switch 16 which selects one of the wheel speed indicative data $Vw_{FL}$, $Vw_{FR}$ and $Vw_R$ having the highest value to feed the select HIGH output $Vw_H$ to a vehicle speed representing value projecting circuit 17 which will be discussed in detail later.

Figure 4A:
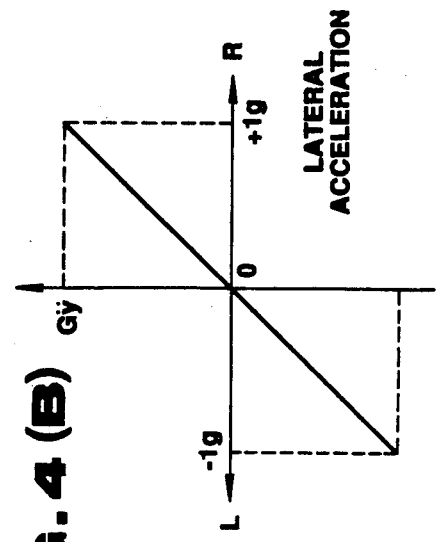
FIGS. 4(a) and 4(b) are charts showing the relationship between sensor outputs of longitudinal and lateral acceleration sensors and longitudinal and lateral accelerations monitored
Figure 4B:
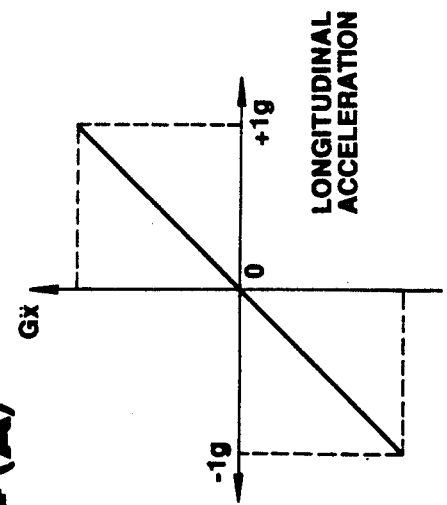

The vehicle speed representing value projecting circuit 17 is also connected to a longitudinal acceleration sensor 13 which monitors longitudinal acceleration exerted on the vehicular body to produce a longitudinal acceleration indicative signal Gx. As seen from FIG. 4(A), the longitudinal acceleration indicative signal Gx has zero value as long as longitudinal acceleration is zero and varies in proportion to increasing and decreasing of the longitudinal acceleration. As can be seen from FIG. 4(A), the longitudinal acceleration indicative signal value is thus positive while the vehicle is accelerating and is negative while the vehicle is decelerating. Therefore, the polarity of the longitudinal acceleration indicative signal represents accelerating and decelerating states of the vehicle. The vehicle speed representing value derivation circuit 17 derives a projected vehicle speed representing value Vi on the basis of the select HIGH output $Vw_H$ and the longitudinal acceleration indicative signal Gx to supply to a wheel speed difference correction circuit 18. The wheel speed difference correction circuit 10 is also connected to a lateral acceleration sensor 14 which serves as monitoring means for detecting a parameter reflecting tightness or hardness of cornering and monitors lateral acceleration exerted on the vehicular body for producing a lateral acceleration indicative signal Gy. As shown in FIG. 4(B), the lateral acceleration sensor 14 employed in the embodiment shown, produces the positive value lateral acceleration indicative signal having a value linearly proportional to the magnitude of left hand lateral acceleration caused by a right hand turn and the negative value lateral acceleration indicative signal having a value linearly proportional to the magnitude of right hand lateral acceleration caused by a left hand turn. The wheel speed difference correction circuit 18 derives a correction value $\Delta V$ on the basis of the vehicle speed representing value Vi and the lateral acceleration, which correction value represent wheel speed difference to be caused by a required speed difference for cornering irrespective of the wheel slippage caused by deceleration. The correction value $\Delta V$ thus derived is fed to wheel slippage threshold setting circuits 19FL, 19FR and 19R. The wheel slippage threshold setting circuits 19FL, 19FR and 19R also receive the vehicle speed representing value Vi. The wheel slippage threshold setting circuits 19FL, 19FR and 19R derive wheel slippage threshold $S_{FL}$, $S_{FR}$ and $S_R$ for respective ones of associate wheels 1FL, 1FR and 1R on the basis of the vehicle speed representing value Vi and the correction value $\Delta V$. The wheel slippage thresholds $S_{FL}$, $S_{FR}$ and $S_R$ are fed to the input interface 25g of the microprocessor 25.

It should be noted that the wheel slippage thresholds $S_{FL}$, $S_{FR}$ and $S_R$ will be generally referred to by the reference numeral $S_O$ when generally discussed.

The microprocessor 25 further includes an arithmetic circuit 25b, a memory unit 25c and an output interface 25d. The microprocessor 25 processes the wheel speed indicative values $Vw_{FL}$, $Vw_{FR}$ and $Vw_R$ and the wheel slippage thresholds $S_{FL}$, $S_{FR}$ and $S_R$ to derive EV signal for controlling the valve position of the EV valves 8, an AV signal for controlling the valve position of the AV valve 9 and an MR signal for controlling operation of the fluid pump 10. The EV signal, AV signal and MR signal are fed to respective ones of actuators 45g and the pump motor 45c via the output interface 25d and amplifiers 22a, 22b and 22c.

Figure 3:
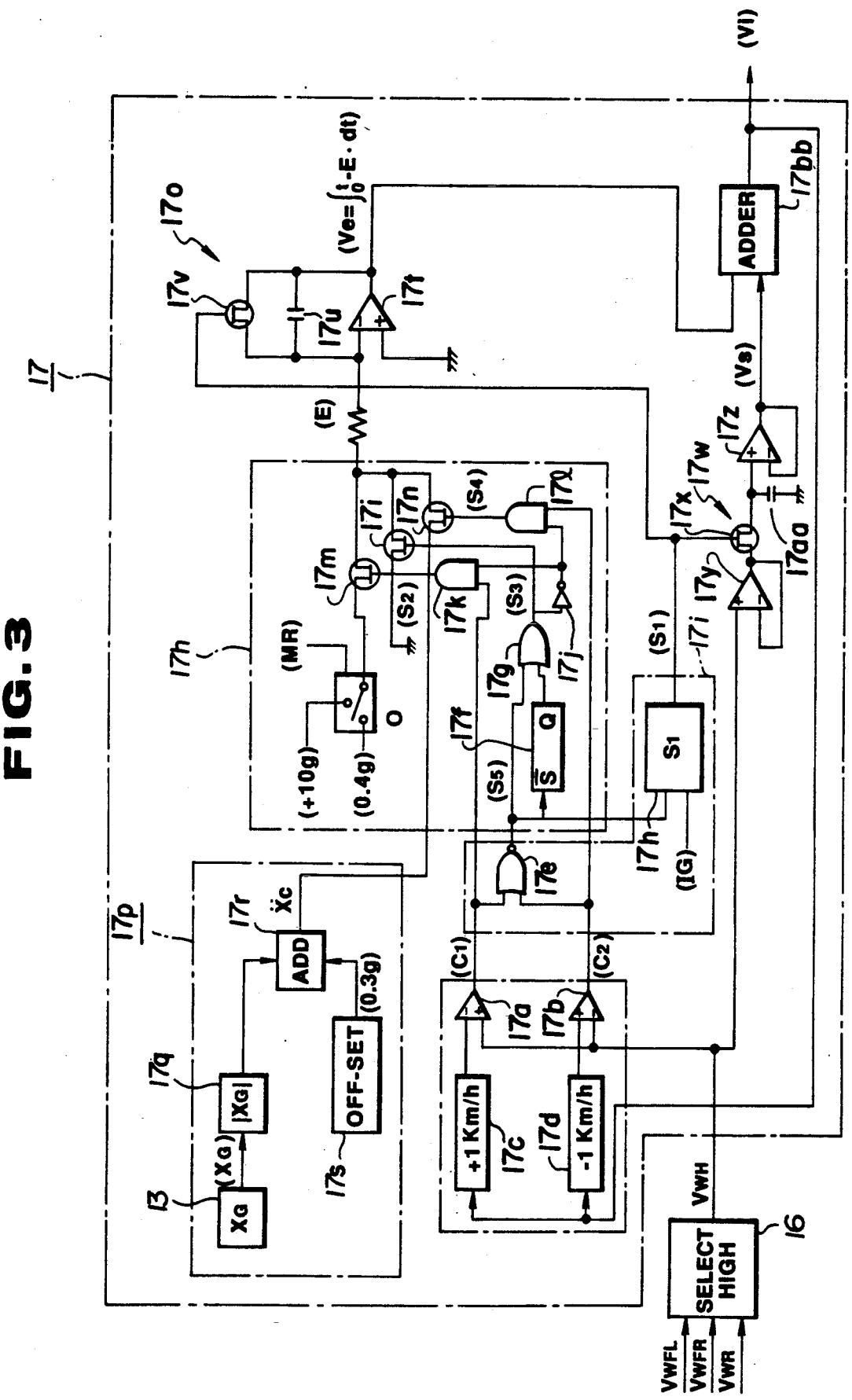
FIG. 3 is a circuit diagram of a vehicle speed representative data derivation circuit employed in the anti-skid brake control system of FIG. 1

FIG. 3 shows the detailed construction of the vehicle speed representing value projecting circuit 17. As set forth above, the vehicle speed representing value projecting circuit 17 derives a vehicle speed representing value Vi based on the wheel speeds $Vw_{FL}$, $Vw_{FR}$ and $Vw_R$ as indicated in the wheel speed indicative signals from the wheel speed derivation circuits 15FL, 15FR and 15R. The vehicle speed representing value projecting circuit 17 includes comparators 17a and 17b. The comparator 17a has a non-inverting input terminal connected to the wheel speed derivation circuits 15FL, 15FR and 15R via a select HIGH circuit 16. On the other hand, the comparator 17b is connected to the wheel speed derivation circuits 15FL, 15FR and 15R at an inverting input terminal. An inverting input terminal of the comparator 17a is connected to output terminal of the vehicle speed representing value projecting circuit 17 through which the vehicle speed representing value Vi is output, through an adder 17c. On the other hand, the non-inverting input terminal of the comparator 17b is connected to the output terminal of the vehicle speed representing value projecting circuit 17 through a subtractor 17d. The adder 17c is designed to add a given value corresponding to 1 km/h of vehicle speed to the vehicle speed representing value Vi for providing a dead band of +1 km/h. The value as the sum of the vehicle speed representing value Vi and the dead band value 1 km/h will be hereafter referred to as "higher vehicle speed reference value". Similarly, the subtractor 17d subtracts a given value corresponding to 1 km/h of the vehicle speed from the vehicle speed representing value Vi for providing a dead band of −1 km/h. The value as the difference of the vehicle speed representing value Vi and the dead band value −1 km/h will be hereafter referred to as "lower vehicle speed reference value. The comparator 17a outputs a HIGH level comparator signal when the wheel speed $Vw_{FL}$, $Vw_{FR}$ or $Vw_R$ is higher than or equal to the higher vehicle speed reference value ($Vi_1$ +1 km/h). In other words, the comparator signal level of the comparator 17a is held LOW as long as the wheel speed $Vw_{FL}$, $Vw_{FR}$ or $Vw_R$ is maintained lower than the lower vehicle speed reference value (Vi +1 km/h). The comparator 17b outputs a HIGH level comparator signal when the wheel speed $Vw_{FL}$, $Vw_{FR}$ or $Vw_R$ is lower than the lower vehicle speed reference value (Vi −1 km/h). In other words, the comparator signal level of the comparator 17a is held LOW as long as the wheel speed $Vw_{FL}$, $Vw_{FR}$ or $Vw_R$ is maintained higher than or equal to the lower vehicle speed reference value (Vi −1 km/h).

The output terminals of the comparators 17a and 17b are connected to input terminals of NOR gate 17e to feed the comparator signals $C_1$ and $C_2$ thereto. The NOR gate 17e outputs a HIGH level gate signal while signal levels of both of the comparator signals $C_1$ and $C_2$ are maintained LOW. Namely, the gate signal output from the NOR gate 17c is held LOW while the select HIGH input of the wheel speed $Vw_{FL}$, $Vw_{FR}$ or $Vw_R$ is maintained higher than or equal to the vehicle speed representing value vi−1 km/h and lower than the higher vehicle speed reference value (Vi+1 km/h). The gate signal of the NOR gate 17e is fed to a timer 17f, an OR gate 17g and a one shot-pulse generator 17h, respectively. The timer 17f is responsive to the trailing edge of the HIGH level NOR gate signal to output a timer signal for a given period of time, e.g. 0.1 sec. The timer signal is fed to the OR gate 17g.

The OR gate 17g thus receives the NOR gate signal at one input terminal and the timer signal from the timer 17f at the other input terminal. An OR gate signal of the OR gate 17g is transmitted to a gate of an analog switch 17i as a selector signal $S_3$. The output terminal of the OR gate 17g is also connected to one input terminal of AND gates 17k and 17l via an inverter 17j. The other input terminal of the AND gate 17k is connected to the output terminal of the comparator 17a to receive therefrom the comparator signal $C_1$. Similarly, the other input terminal of the AND gate 17l is connected to the output terminal of the comparator 17b to receive the comparator signal $C_2$ therefrom. Therefore, the gate signal $S_2$ of the AND gate 17k becomes HIGH while the comparator signal $C_1$ is maintained at HIGH level and the NOR gate signal is held LOW. The gate signal $S_2$ serves as a selector signal. On the other hand, the gate signal $S_4$ of the AND gate 17l becomes HIGH level while the comparator signal $C_2$ is maintained HIGH and the NOR gate signal is held LOW. This gate signal $S_4$ also serves as selector signal. The AND gates 17k and 17l are connected to gates of analog switches 17m and 17n.

The analog switch 17i is turned ON in response to HIGH level selector signal $S_3$ to drop the supply voltage to an integrator circuit 17o to zero. On the other hand, the analog switch 17m is turned ON in response to the HIGH level selector signal $S_2$ to supply a voltage E corresponding to a possible maximum wheel acceleration, e.g. 0.4 G, to the integrator circuit 17o. The analog switch 17n is connected to a correction circuit 17p which is designed for correcting the longitudinal acceleration indicative signal value $X_G$ for deriving a minimum wheel acceleration representative value $X_{GC(-m)}$. The analog switch 17n is likewise turned ON in response to the HIGH level selector signal $S_4$ to supply a voltage corresponding to possible minimum wheel acceleration value to the integrator circuit 17o.

The correction circuit 17p includes an absolute value circuit 17q connected to the longitudinal acceleration sensor 13 to receive therefrom the longitudinal acceleration indicative signal $X_G$ and output absolute value signal representative of the absolute value $|X_G|$ of the longitudinal acceleration indicative signal. The absolute value signal of the absolute value circuit 17q is input to an adder 17r. The adder 17r also receives an offset value from an offset value generator circuit 17s. The adder output is supplied to the analog switch 17n via an inverter output as the minimu wheel acceleration representative value $X_{GC(-m)}$.

The integrator circuit 17o has a per se well known construction and consists of an amplifier 17t, a capacitor 17u and an analog switch 17v. The gate of the analog switch 17v is connected to the shot-pulse generator 17h to receive therefrom a shot-pulse which serves as a reset signal $S_1$. The integrator 17o is reset by the HIGH level reset signal $S_1$ and is responsive to the trailing edge of the HIGH level reset signal to reset the integrated value. The integrator circuit 17o integrates the supply voltage E after termination of the HIGH level reset signal $S_1$ to output the integrator signal. The one shot-pulse generator 17h is responsive to an ON-set signal IG of an ignition switch to generate a first shot pulse as the first reset signal for resetting the integrator circuit 17c. The one shot-pulse generator 17h subsequently generates the one shot-pulses serving as the reset signal $S_1$ at every leading edge of the HIGH level NOR gate signal. As set forth above, since the NOR gate signal becomes HIGH when the select HIGH input of the wheel speeds $Vw_{FL}$, $Vw_{FR}$ and $Vw_R$ satisfies (Vi−1 km/h) $<=$ Vw $<$(Vi+1 km/h), the integrated value of the integrator 17o is reset every occurrence of the wheel speed Vw in the aforementioned range. The reset signal $S_1$ of the shot-pulse generator 17h is also supplied to a sample hold circuit 17w. The sample hold circuit 17w comprises buffer amplifiers 17y and 17z, a capacitor 17aa and an analog switch 17x. The analog switch 17x is connected to the one shot-pulse generator 17h to receive the reset signal $S_1$ at the gate thereof to be turned ON. The sample hold circuit 17w is responsive to turning ON of the analog switch 17x to reset the held wheel speed value. The sample hold circuit 17w in the absence of the reset signal $S_1$ from the one shot-pulse generator 17h, samples and holds the instantaneous wheel speed value Vw at the occurrence of the reset signal as a sample value Vs. The sample hold circuit 17w outputs a sample/hold signal having a value indicative of the sample value Vs to an adder 17bb. The adder 17bb receives the sample/hold signal from the sample hold circuit 17w and integrator signal from the integrator 17o. As will be appreciated, the integrator signal has a value indicative of an integrated value $$Ve = \int_0^t (-E) \cdot dt.$$

Therefore, the adder 17bb adds the integrated value Ve to the sample value Vs to derive the vehicle speed representing value Vi. The output terminal of the adder 17bb is connected to the anti-skid control channel.

Figure 5:
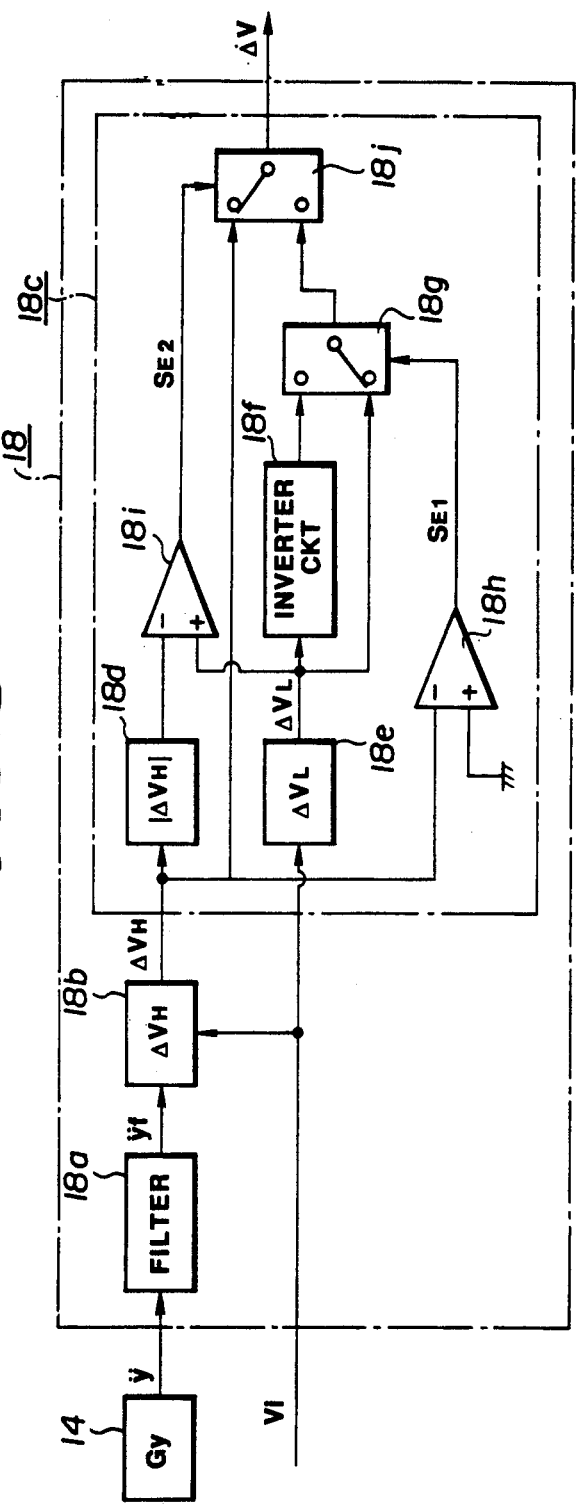
FIG. 5 is a block diagram of a wheel speed difference dependent correction value derivation circuit employed in the preferred embodiment of the anti-skid brake control system of FIG. 1
Figure 8:
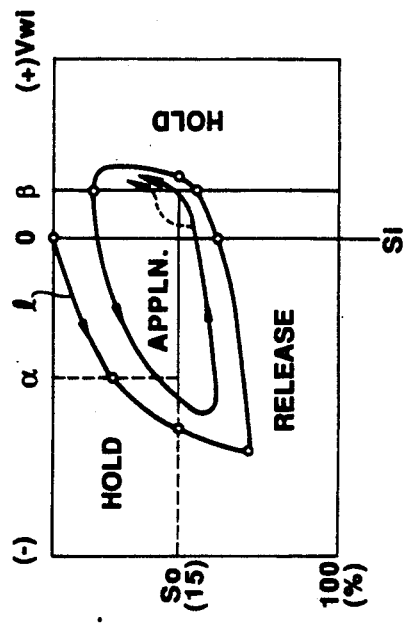

FIG. 5 shows the wheel speed difference correction circuit 18. The wheel speed difference correction circuit 18 has a noise filter 18a to which the lateral acceleration indicative signal Gy from the lateral acceleration sensor 14 is input. The noise filter 18a is designed to remove the noise component from the lateral acceleration indicative signal input thereto. The filter output Gy_f from the noise filter 18a is supplied to a correction value generating circuit 18b. The correction value generating circuit 18b also receives the vehicle speed representing value Vi from the vehicle speed representing value projecting circuit 17.

Here, the relationship between the wheel speed at the inner wheel with respect to the curve center, and the wheel speed difference between the inner and outer wheels are as illustrated in FIG. 6. Therefore, based on the wheel speed, the lateral acceleration indicative value, and radius R of the curve, the wheel speed difference dependent correction value $\Delta V_H$ is derived by the correction value generating circuit 18b by using the following equation:

$$\Delta V_H = (183 \times Gy_f)/Vi$$

The wheel speed difference dependent correction value $\Delta V_H$ is fed to an absolute value circuit 18d of a limiter circuit 18c. The absolute value circuit 18d outputs the absolute value signal of the wheel speed difference dependent correction value $\Delta V_H$ to the inverting input terminal of a comparator 18i. The wheel speed difference dependent correction value $\Delta V_H$ is also fed to one switch terminal of a selector switch 18j. The wheel speed difference dependent correction value $\Delta V_H$ is further fed to the inverting input terminal of a comparator 18h which has the non-inverting input terminal connected to the ground level.

The limiter circuit 18c also has a function generator 18e which receives the projected vehicle speed representing value Vi from the vehicle speed representing value deriving circuit 17 to generate a correction limit value $\Delta V_L$ according to the characteristics illustrated in FIG. 6. The function generator 18e feeds the correction limit value $\Delta V_L$ to the non-inverting input terminal of the comparator 18i. The correction limit value $\Delta V_L$ is also fed to an inverting circuit 18f which inverts the correction limit value $\Delta V_L$ and outputs its to one switching terminal of a selector switch 18g. The selector switch 18g has another switch terminal directly connected to the function generator 18e so as to be input the non-inverted correction limit value. The selector switch 18g is designed to be switched the switch position depending upon the level of the output $SE_1$ of the comparator 18h. Since the non-inverting input terminal of the comparator 18h is grounded, the comparator output $SE_1$ is maintained HIGH level while the wheel speed difference dependent correction value $\Delta V_H$ is maintained greater than or equal to zero and turns into LOW level in response to the negative value of the wheel speed dependent correction value $\Delta V_H$. The output of the selector switch 18g is connected to another switch terminal of the selector switch 18j. The selector switch 18j is designed to be switched to change switch position dependent upon the signal level of the comparator output $SE_2$ of the comparator 18i. The comparator 18i feeds HIGH level output $SE_2$ when the absolute value $|\Delta V_H|$ is smaller than or equal to the correction limit value $\Delta V_L$ and otherwise feeds LOW level output. Selected one of the wheel speed dependent correction value $\Delta V_H$, the correction limit value $\Delta V_L$ and the inverted value $\Delta V_L$ is output as the correction value $\Delta V$.

The wheel slippage threshold setting circuits 19FL, 19FR and 19R each derives the wheel slippage threshold $S_{FL}$, $S_{FR}$ and $S_R$ based on the vehicle speed representing value Vi and the correction value $\Delta V$. The wheel slippage threshold setting circuit 19FL for the front-left wheel performs an arithmetic operation to derive the wheel slippage threshold $S_{FL}$ according to the following equation:

$$S_{FL} = Vi \times 0.95 - 4 - \text{MIN}(0, \Delta V)$$

Similarly, the wheel slippage threshold setting circuit 19FR for the front-right wheel performs an arithmetic operation to derive the wheel slippage threshold $S_{FR}$ according to the following equation:

$$S_{FR} = Vi \times 0.95 - 4 - \text{MAX}(0, \Delta V)$$

Also, the wheel slippage threshold setting circuit 19R for the rear wheels performs an arithmetic operation to derive the wheel slippage threshold $S_R$ according to the following equation:

$$S_R = Vi \times 0.95 - 4 - |\Delta V|$$

Figure 7:
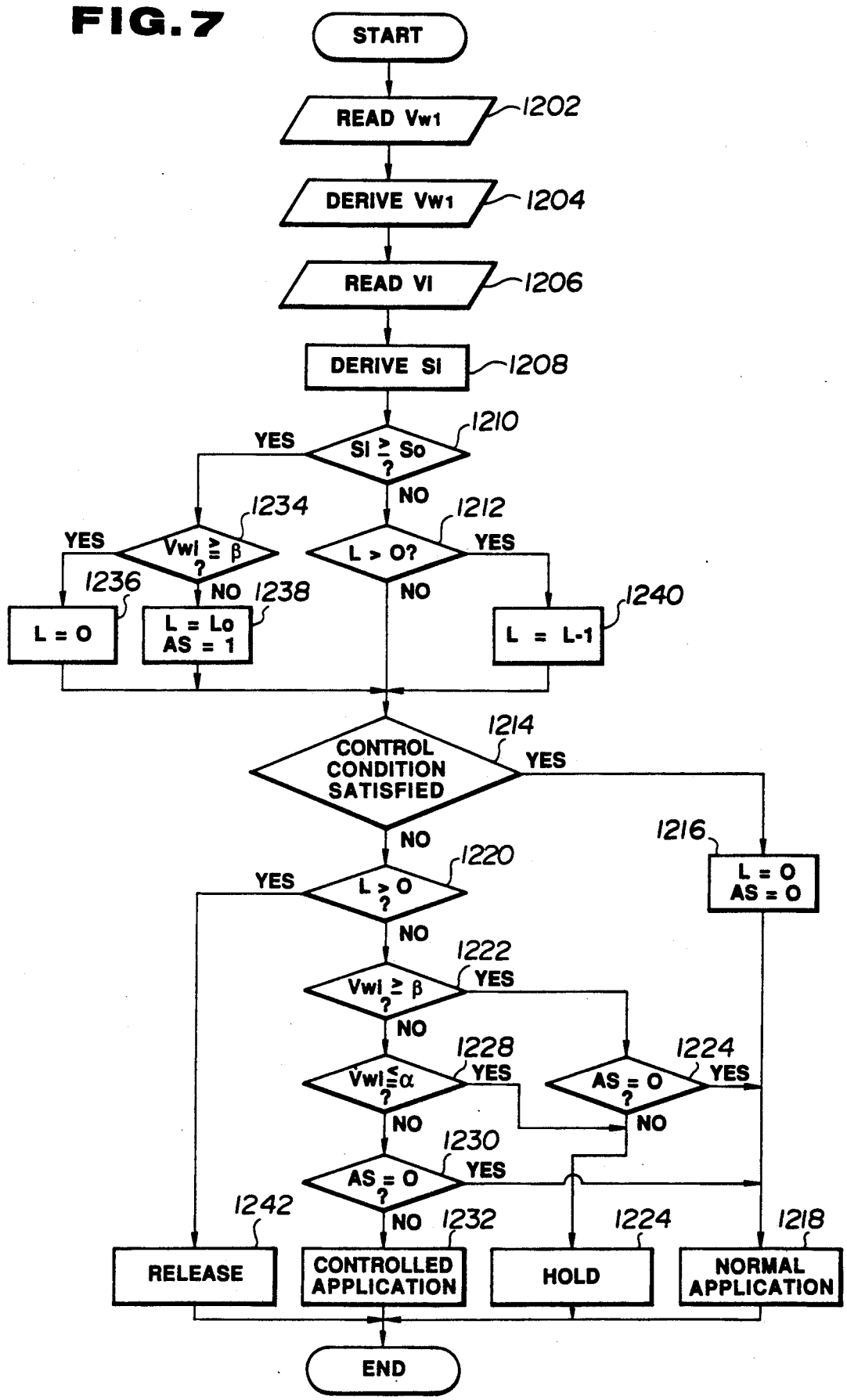
FIG. 7 is a flowchart showing a process of anti-skid control to be performed by the preferred embodiment of the anti-skid brake control system

FIG. 7 shows a skid cycle control routine for controlling the skid control cycle generally according to the schedule set forth in the general discussion of the process of anti-skid brake control.

Immediately after starting execution, the selected average wheel acceleration indicative data $\alpha$ and the selected wheel deceleration threshold $-\alpha_2$ are read out at a step 1202. At a step 1204, the wheel speed indicative data Vw is read out. At a step 1206, the vehicle body speed representative data $V_{ref}$ is read out. At a step 1208, the wheel slippage Si is derived according to the following equation:

$$Si = \{(V_{ref} - Vw)/V_{ref}\} \times 100(\%)$$

The wheel slippage Si is a compared with a predetermined wheel slippage thresholds $S_0$ at a step 1210. It should be appreciated that the wheel slippage threshold $S_0$ utilized at the step 1210 is corresponding one of the wheel slippage threshold $S_{FL}$, $S_{FR}$ and $S_R$ derived by the wheel slippage threshold setting circuits 19FL, 19FR and 19R.

The embodiment shown performs an APPLICATION mode operation in mutually different two way modes. The braking pressure increases linearly according to increasing of the fluid pressure built up in the master cylinder 72. Such an operational mode will be hereafter referred to as the "NORMAL APPLICATION mode". The pressure control valve is operated alternatively to the APPLICATION mode position and HOLD mode position for increasing the braking pressure in stepwise fashion. This operation mode will be hereafter referred to as the "CONTROLLED APPLICATION mode". The CONTROLLED APPLICATION mode is introduced in order to lower increasing speed of the braking pressure in the wheel cylinder so that the braking pressure is held at a level close to a pressure where the optimum wheel slippage is obtained and hereafter referred to as the "lock pressure", for an expanded period.

At the initial stage of the braking operation, wheel slippage Si is held smaller than that wheel slippage threshold $S_0$. Therefore, the answer at the step 1210 at the initial braking state becomes negative. Then, at a step 1212, a check is performed to determine whether a RELEASE mode timer value L of a RELEASE mode timer (not shown but facilitated in the arithmetic circuit 12c of the microprocessor) is greater than zero or not.

At this time, the RELEASE mode timer value L is maintained at zero, the answer at the step 1212 also becomes negative. Then, at a step 1214, a judgement is made that the condition satisfies a predetermined skid control terminating condition.

In the practical embodiment, the skid control terminating conditions are set as follows:
when the vehicle body speed indicative data $V_{ref}$ is smaller than or equal to a vehicle body stopping state indicative reference value $V_{ref0}$;
when the number of occurence of switching of the pressure control valve mode position in the CONTROLLED APPLICATION mode becomes greater than or equal to a predetermined value $n_0$; and
when the brake switch is turned OFF.

When the skid control terminating condition is satisfied as checked at the step 1214, the RELEASE mode timer value L is cleared and a skid control state indicative period flag AS is reset at a step 1216. At a step 1218, the NORMAL APPLICATION mode skid control cycle period is commanded. Thereafter, process goes to END.

If the skid control terminating condition as checked at the step 1214 is not satisfied, the RELEASE mode timer value L is again checked at a step 1220. When the RELEASE mode timer value L is smaller than or equal to zero as checked at the step 1220, the wheel acceleration $\alpha$ is compared with a predetermined acceleration threshold $+\alpha_1$ at a step 1222. If the acceleration as checked at the step 1222 is greater than or equal to the wheel acceleration threshold $+\alpha_1$, it means that the wheel is not yet decelerated after initiation of increasing of the braking pressure or the wheel is accelerated during RELEASE mode cycle period. Therefore, in order to discriminate the instantaneous status of the braking condition, check is performed whether the skid control state indicative flag AS is set at a step 1224. When the skid control state indicative flag AS is not set as checked at a step 1224, then the process goes to the process through the step 1218 for setting the operation mode to the NORMAL APPLICATION mode.

On the other hand, when the skid control state indicative flag AS is set as checked at the step 1224, then judgement is made that it is the time to switch the skid control cycle from the RELEASE mode cycle period to the HOLD mode cycle period because the wheel acceleration $\alpha$ is held greater than the wheel acceleration threshold $+\alpha_1$ and the operational mode is held in the RELEASE mode. Then, HOLD mode cycle period is commanded at a step 1226. After commanding the HOLD mode cycle period, the process goes to END.

On the other hand, when the wheel acceleration $\alpha$ as compared with the wheel acceleration threshold $+\alpha_1$ at the step 1222, is smaller than the acceleration threshold $+\alpha_1$, then the wheel acceleration $\alpha$ is checked with a predetermined wheel deceleration threshold $-\alpha_2$ at a step 1228. When the wheel acceleration $\alpha$ as checked at the step 1228 is smaller than the wheel deceleration threshold $-\alpha_2$, it means that the braking condition requires anti-skid control. Then, at the step 1226, the HOLD mode cycle period is commanded for placing the pressure control valve 16 at the HOLD mode position, at a step 1226.

If the wheel acceleration $\alpha$ as compared with the wheel deceleration threshold $-\alpha_2$ at the step 1228 is greater than the wheel deceleration threshold, the skid control state indicative flag AS is checked at a step 1230. If the skid control mode indicative flag AS is not set as checked at the step 1230, the process goes to the step 1218. On the other hand, when the skid control state indicative flag AS is not set as checked at the step 1230, the CONTROLLED APPLICATION mode cycle period is commanded at a step 1232.

On the other hand, when wheel slippage Si as checked at the step 1210 is greater than or equal to the wheel slippage threshold $S_0$, then the wheel acceleration $\alpha$ is compared with the wheel acceleration threshold $+\alpha_1$ at a step 1234. When the wheel acceleration $\alpha$ as checked at the step 1230 is greater than or equal to the wheel acceleration threshold $+\alpha_1$, judgement can be made that the condition is not satisfied to perform the RELEASE mode skid control cycle period operation. Therefore, the RELEASE mode timer value L is cleared at a step 1236. On the other hand, when the wheel acceleration $\alpha$ as checked at the step 1234 is smaller than the wheel acceleration threshold $+\alpha_1$, judgement can be made that a condition for performing the RELEASE mode skid control mode cycle period is satisfied. Therefore, at a step 1238, the RELEASE mode timer value L is set at a predetermined initial timer value $L_0$ which represents a period to maintain RELEASE mode skid control cycle period after the wheel slippage Si is decreased across the wheel slippage threshold $S_0$. At the same time, the skid control state indicates flag AS.

When the RELEASE mode timer value L as checked at the step 1212 is greater than zero (0), then, the RELEASE mode timer value L is decremented by one (1) at a step 1240 and thereafter process moves to the step 1214. When the RELEASE mode timer value L as decremented at the step 1240 is still held greater than zero (0), the answer at the step 1220 becomes positive since the RELEASE mode timer value is greater than zero. Then, the process goes to a step 1242 to command the RELEASE mode skid control cycle period.

The operation of the projected vehicular speed derivation circuit 17 will be discussed herebelow with reference to FIGS. 10 and 11.

At first the operation of the projected vehicular speed derivation circuit 17 will be discussed assuming that the common wheel speed representative data Vw varies as shown in FIG. 10. It is further assumed that the gradient ($-m$) is maintained constant.

Figure 9:
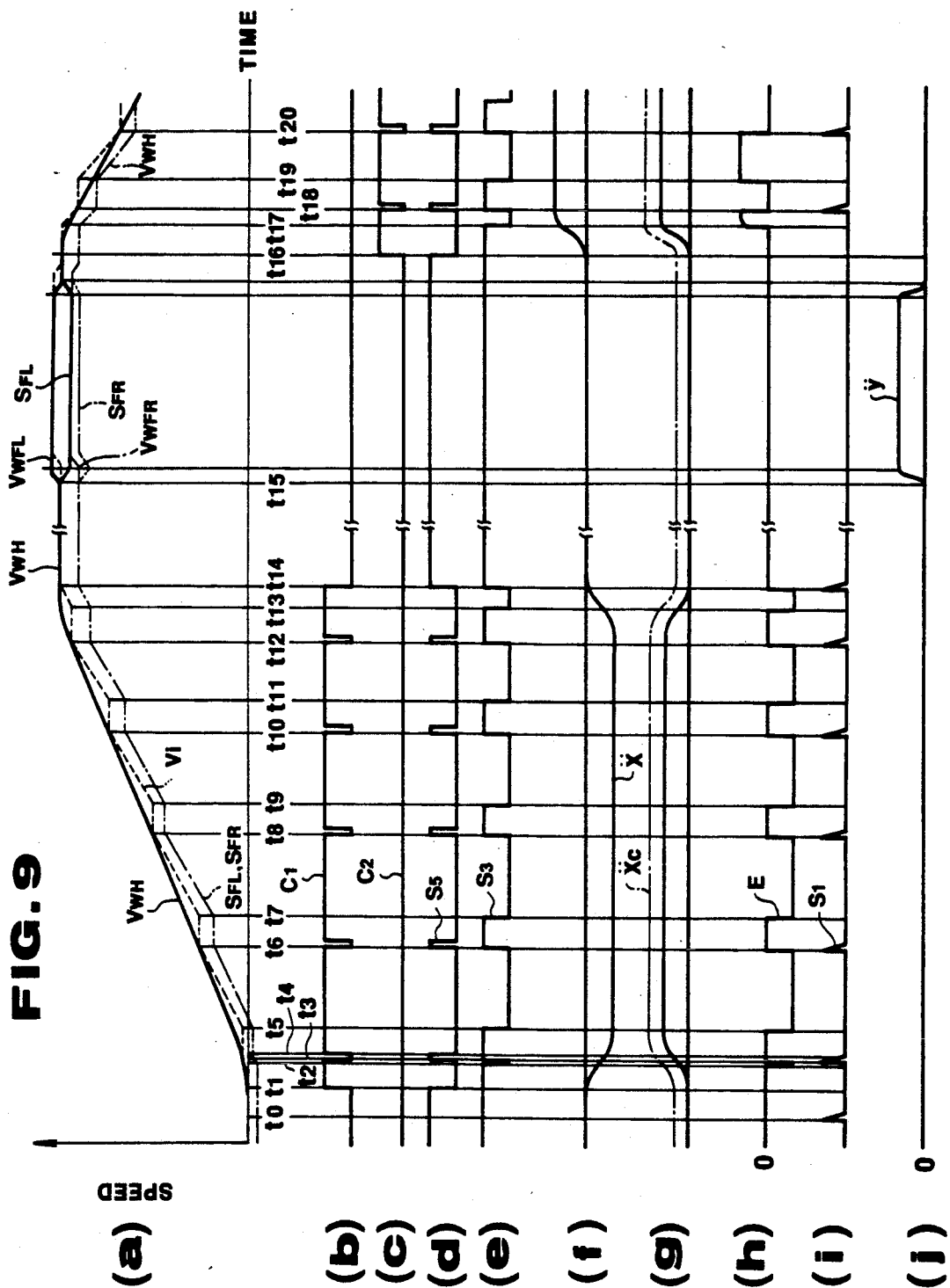

At a time $t_0$, the ignition switch is turned into ON from an OFF position. Therefore, the one-shot pulse generator circuit 17h is responsive to the leading edge of the HIGH level ignition signal IG to generate the shot pulse $S_1$ as shown in FIG. 9(i), which serves as the reset pulse for the integrator circuit 17o and the sample/hold circuit 17w. By the shot pulse $S_1$, the integrator circuit 17o is cleared the integrated value Ve to zero to restart integration of the voltage signals E input through the analog switches 17m, 17i and 17n. At the same time, the sample/hold circuit 17w is reset the sampled value and update the sampled value Vs with the instantaneous common wheel speed representative data Vw at the time $t_0$. At the time $t_0$, since the integrated value Ve is reset and thus is zero (0), the output value as the projected vehicular speed representative data Vi becomes equal to the sampled value Vs of the sample/hold circuit 17w. Upon starting up of the system in response to turning ON of the ignition switch, the vehicle does not run and thus the wheels are not rotating. Therefore, the common wheel speed representative data Vw supplied from the select HIGH circuit 16 represents zero wheel speed. As a result, the sampled value Vs becomes zero.

At this time $t_0$, since the sampled value Vs is equal to the common wheel speed representative data Vw, it becomes smaller than the upper deadband reference signal value Vi+ and greater than the lower deadband reference signal value Vi−. Therefore, both outputs C1 and C2 of the comparators 17a and 17b become LOW level as shown in FIGS. 9(b) and 9(c). Therefore, the output of the NOR gate 17e becomes HIGH level. By the HIGH level gate signal of the NOR gate 17e, the outlet level of the OR gate 17g is maintained HIGH. The gate signal $S_3$ output from the OR gate 17g serves as select signal for selecting a switch position of the analog switch 17i. By this HIGH level gate signal $S_3$ of the OR gate 17g, the analog switch 17i is turned ON to connect the inverting input terminal of the operational amplifier 17t of the integrator circuit 17o to ground. At this time, because of the LOW level comparator signals C1 and C2 of the comparators 17a and 17b, the AND gates 17k and 17l are held non-conductive to maintain respectively associated analog switches 17m and 17n at non-conductive state. Since the analog switch 17i is connected to the ground level for grounding, the input voltage E for the integrator circuit 17o is maintained zero, as shown in FIG. 19(h). Therefore, the integrated value of the integrator circuit 17o is maintained zero. Therefore, the projected vehicular speed representative data Vi is maintained at the sampled value Vs.

Then, the vehicle starts to run. According to the start of vehicle running, the longitudinal acceleration $X_G$ increases accordingly. At the same time, according to running of the vehicle, the wheel rotates to cause increasing of the wheel speed indicative signal values. Assuming the common wheel speed representative data Vw becomes greater than or equal to the upper deadband reference signal value Vi+ at a time $t_1$, the output level of the comparator 17a turns into HIGH as shown in FIG. 19(a). By turning the comparator signal C1 into a HIGH level, the output level of the NOR gate 17e becomes LOW. However, at this time, the off-delay timer 17f is set by the trailing edge of the HIGH level gate signal of the NOR gate 17e to input HIGH level signal to the OR gate 17g for the given period of time $T_3$. Therefore, during the period $T_3$, the output level of the OR gate 17g is maintained at a HIGH level as shown in FIG. 19(e). By this HIGH level gate signal of the OR gate 17g, the one input to the AND gate 17k is maintained at LOW level due to inversion of the OR gate signal performed by the inverter 17j. Therefore, the AND gate 17k is maintained non-conductive despite the HIGH level comparator signal of the comparator 17a.

Upon expiration of the $T_3$ period, the OR gate signal across the common wheel speed representative data Vw, at a time $t_3$. As a result, the comparator signal $C_1$ of the comparator 17a turns into LOW level to turn the gate signal of the NOR gate 17c into HIGH level. In response to the HIGH level gate signal of the NOR gate 17e, the one-shot pulse generator circuit 17h produces the shot pulse to reset the sample/hold circuit 17w to hold the instantaneous common wheel speed representative data Vw as the sampled value Vs. Therefore, at the time $t_3$, the sampled value Vs becomes the instantaneous value of the common wheel speed representative data Vw. At the same time, the integrated value Ve of the integrator circuit 17o is cleared. Similarly to the process set forth with respect to the period $t_0$ to $t_3$, the projected vehicular speed representative data Vi is maintained at a value corresponding to the sampled value Vs until the given period $T_3$ of the timer 17f expires. Therefore, the integrated value Ve starts to increase in order to increase the projected vehicular speed representative data Vi toward the common wheel speed representative data Vw after expiration of the aforementioned $T_3$ period. During this period, since the vehicle is maintained at an accelerating condition, the common wheel speed representative data Vw reaches or becomes greater than the deadband reference signal Vi+ to cause a HIGH level comparator signal C1 at a time $t_4$.

After expiration of the $T_3$ period at a time $t_5$, the gate signal level $S_5$ of the OR gate 17g turns into LOW level. As a result, the analog switch 17i is switched OFF and the analog switch 17m is turned ON. Therefore, the projected vehicle speed representative data Vi is again increased in a ratio of +0.4 g. Again, at a time $t_6$, the common wheel speed representative data Vw reaches the upper deadband reference signal value Vi+ to turn the output level of the comparator 17a to LOW level. By this, the integrator 17o is reset. At the same time, the sample/hold circuit 17w holds the instantaneous value of the common wheel speed representative data Vw as the sampled value Vs. The process of the period between the time $t_5$ to $t_6$ and between the time $t_6$ to $t_7$ is repeated through the period between $t_7$ to $t_{14}$. The common wheel speed representative data Vw fluctuates across the upper and lower deadband reference signal values Vi+ and Vi− at a frequency to have an interval shorter than the $T_3$ period as seen from FIG. 10. According to variation of the common wheel speed representative data Vw across the upper deadband reference signal value Vi+, the comparator signal of the comparator 17a turned into a HIGH level.

It is assumed that the vehicular brake is applied for deceleration at a time $t_{16}$. In response to application of brake, the common wheel speed representative data Vw decreases across the lower deadband reference signal value Vi−.

At the time $t_{16}$, the common wheel speed representative data Vw from the select-HIGH switch 16 decreases across the lower deadband reference signal value Vi−. In response to this, the comparator signal $C_2$ of the comparator 17b turns into a HIGH level. By the HIGH level comparator signal $C_2$ of the comparator 17b, the gate signal level of the NOR gate 17e turns LOW. Similarly to the above, the off-delay timer 17f is triggered by the trailing edge of the HIGH level gate signal of the NOR gate 17e to output HIGH level signal for the period $T_3$. Therefore, the gate signal of the OR gate 17g is maintained for the $T_3$ period in spite of the presence of the HIGH level comparator signal of the comparator 17b. At a time $t_{17}$, the $T_3$ period expires and the common wheel speed representative data Vw is held smaller than the lower deadband reference signal value Vi−, the gate signal of the OR gate 17g turns into a LOW level to cause switching of the analog switch 17n from a conductive state to a non-conductive state. Simultaneously, the AND gate 17l becomes conductive to turn the analog switch 17n ON. As a result, the correction circuit 17p is connected to the integrator circuit 17o to input the deceleration reference signal $X_{GC}$ (−m′) which represents the deceleration gradient modified to maintain the value within the upper and lower limit values, to the latter as the input voltage E. Therefore, the integrated value Ve decreases at a rate corresponding to the gradient defined by the deceleration reference signal value $X_{GC}$. Accordingly, the projected vehicular speed representative value Vi decreases at the corresponding rate.

At a time $t_{18}$, the common wheel speed representative data Vw increases across the lower deadband reference signal value Vi−. Therefore, the comparator signal $C_2$ of the comparator 17b turns into LOW level. By this, the NOR condition of the NOR gate 17e is established to cause HIGH level gate signal of the latter. The one-shot pulse generator circuit 17h is responsive to the leading edge of the HIGH level gate signal of the NOR gate 17e to generate the one shot pulse. By this one-shot pulse, the integrator circuit 17o is reset to clear the integrated value Ve. At the same time, the sample/hold circuit 17w is reset to update the sampled value Vs with the instantaneous common wheel speed representative data Vw.

In the period between the time $t_{18}$ and $t_{19}$, though the common wheel speed representative data Vw fluctuates across the upper and lower deadband reference signal values Vi+ and Vi−. However, similarly to that in the period $t_{16}$ to $t_{17}$ set forth above, because of higher frequency than that defined by the $T_3$ period of the timer 17f, the integrated value Ve is maintained zero. After the time $t_{19}$, the common wheel speed representative data Vw decreases across the lower deadband reference signal value Vi−. Therefore, the similar operation to that discussed with respect to the period $t_{16}$ to $t_{18}$ is performed.

During the period between the time $t_0$ to $t_{14}$, the vehicle is assumed to travel straight. In this period, the longitudinal acceleration is maintained substantially zero. Therefore, the wheel speed difference dependent correction value $\Delta V_H$ derived in the wheel speed difference correcting circuit 18 is maintained zero. Therefore, all of the wheel slippage threshold $S_{FL}$, $S_{FR}$ and $S_R$ vary only according to variation of the projected vehicle speed representing value Vi. Therefore, during this period, the wheel slippage thresholds vary in unison as illustrated by the one-dotted line.

During the period between $t_{14}$ and $t_{15}$, it is assumed that the vehicle makes a right hand turn. Then, the left hand lateral acceleration is exerted on the vehicle body to cause a positive value of the lateral acceleration indicative signal Gy, as shown in FIG. 9(j). In response to this, the $\Delta V_H$ is output from the wheel speed difference dependent correction value generating circuit 18b of the wheel speed difference correction circuit 18. At this time, if the absolute value of the wheel speed difference dependent correction value $\Delta V_H$ is greater than the correction limit value $\Delta V_L$, the correction limit value $\Delta V_L$ is output as the correction value $\Delta V$ so that the wheel slippage thresholds $S_{FL}$, $S_{FR}$ and $S_R$ are derived utilizing this correction value. On the other hand, if the absolute value of the wheel speed difference dependent correction value $\Delta V_H$ is smaller than or equal to the correction limit value $\Delta V_L$, the wheel speed difference dependent correction value $\Delta V_H$ is output as the correction value $\Delta V$ so that the wheel slippage thresholds $S_{FL}$, $S_{FR}$ and $S_R$ are derived utilizing this correction value. Applying this correction value $\Delta V$ which is positive value, the wheel slippage thresholds $S_{FR}$ and $S_R$ become smaller than that in straight traveling while the wheel slippage threshold $S_{FL}$ is maintained unchanged.

During a left turn, a similar process takes place to reduce the wheel slippage thresholds $S_{FL}$ and $S_R$.

Therefore, the present invention fulfills all of the objects and advantages sought therefor.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

For example, though the embodiment shown is applied for the automotive vehicle having selective four wheel drive mode and rear wheel drive power train layout, the invention has, of course, application for the vehicle having selective four wheel drive and front wheel drive power train layout. Also, though the embodiment shown employs a wet-type clutch assembly in the transfer unit, the electromagnetic clutch may also be used for switching the power train mode. Furthermore, though the embodiment shown employs the electric motor for driving the oil pump serving as the pressure source, it may be possible to use other types of power sources such as an engine. Also, the pressure control valve for controlling the engaging force of the clutch assembly of the transfer unit may be replaced with a pressure reduction valve or relief valve for adjusting the engaging force.

What is claimed is:

1. An anti-skid brake control system for a vehicle having a vehicle body, a first wheel oriented on one lateral side of said vehicle body, and a second wheel oriented on the other lateral side of said vehicle body, said anti-skid brake control system comprising:
a braking pressure source;
a first wheel cylinder operatively connected to said first wheel;
a second wheel cylinder operatively connected to said second wheel;
first pressure control valve means disposed between said braking pressure source and said first wheel cylinder for adjusting braking pressure in said first wheel cylinder according to a first brake control signal;
second pressure control valve means disposed between said braking pressure source and said second wheel cylinder for adjusting braking pressure in said second wheel cylinder according to a second brake control signal;
first wheel speed sensor means for monitoring rotation speed of said first wheel and producing a first wheel speed indicative signal indicative of said rotation speed of said first wheel monitored;
second wheel speed sensor mans for monitoring rotation speed of said second wheel and producing a second wheel speed indicative signal indicative of said rotation speed of said second wheel monitored;
means for selecting a selected one of said first and second wheel speed indicative signals and deriving a vehicle speed indicative signal indicative of a vehicle speed of said vehicle based on said selected one of said first and second wheel speed indicative signals;
means for detecting a vehicular phenomena occurring when said vehicle is making a turn and producing a third signal representative of said vehicular phenomena detected;

means for deriving a wheel speed difference between said first and second wheels taking place when said vehicle is making a turn in response to said vehicle speed indicative signal and said third signal and producing a wheel speed correction value indicative signal indicative of said wheel speed difference derived;

means for deriving a first wheel slippage threshold value for said first wheel in response to said wheel speed correction value indicative signal;

means for deriving a second wheel slippage threshold value for said second wheel in response to said wheel speed correction value indicative signal; and means for comparing said first wheel speed indicative signal with said first wheel slippage threshold value to produce a first comparison result and said second wheel speed indicative signal with said second wheel slippage threshold value to produce a second comparison result and deriving said first and second brake control signals on the basis of said comparison results.

2. An anti-skid brake control system as claimed in claim 1, wherein said vehicular phenomena detecting means includes lateral acceleration sensor means for monitoring a lateral acceleration to which said vehicle body is subject and producing a lateral acceleration indicative signal indicative of said lateral acceleration monitored.

3. An anti-skid brake control system as claimed in claim 2, wherein said lateral acceleration represents said vehicular phenomena occurring when said vehicle is making a turn and said lateral acceleration indicative signal is said third signal.

4. An anti-skid brake control system as claimed in claim 3, wherein said wheel speed difference deriving means includes means for calculating a ratio of said lateral acceleration indicative signal to said vehicle speed indicative signal.

5. An anti-skid control system as claimed in claim 4, wherein said wheel speed difference is a function of said ratio.

6. An anti-skid brake control method for a vehicle having a vehicle body, a first wheel oriented on one lateral side of said vehicle body, and a second wheel oriented on the other lateral side of said vehicle body, said anti-skid brake control method comprising the steps of:

detecting rotation speed of said first wheel and producing a first wheel speed indicative signal indicative of said rotation speed of said first wheel detected;

detecting rotation speed of said second wheel and producing a second wheel speed indicative signal indicative of said rotation speed of said second wheel detected;

selecting a selected one of said first and second wheel speed indicative signals and deriving a vehicle speed indicative signal indicative of a vehicle speed of said vehicle based on said selected one of said first and second wheel speed indicative signals;

detecting a lateral acceleration to which said vehicle body is subject when said vehicle is making a turn and producing a lateral acceleration indicative signal indicative of said lateral acceleration detected;

deriving a wheel speed difference between said first and second wheels taking place when said vehicle is making a turn in response to said vehicle speed indicative signal and said lateral acceleration indicative signal and producing a wheel speed correction value indicative signal indicative of said wheel speed difference derived;

deriving a first wheel slippage threshold value for said first wheel in response to said wheel speed correction value indicative signal;

deriving a second wheel slippage threshold value for said second wheel in response to said wheel speed correction value indicative signal;

comparing said first wheel speed indicative signal with said first wheel slippage threshold value to produce a first result;

comparing said second wheel speed indicative signal with said second wheel slippage threshold value to produce a second result;

effecting anti-lock control of said first wheel based on said first result of said comparing said first wheel speed indicative signal with said first wheel slippage threshold value; and effecting anti-lock control of said second wheel based on said second result of said comparing said second wheel speed indicative signal with said second wheel slippage threshold value.

7. An anti-lock control method as claimed in claim 6, wherein said wheel speed difference deriving step includes a substep of calculating a ratio of said lateral acceleration indicative signal to said vehicle speed indicative signal.

8. An anti-lock control method as claimed in claim 7, wherein said wheel speed difference is proportional to said ratio.

* * * * *